US012778091B2

(12) United States Patent
Gomez Rodriguez et al.

(10) Patent No.: US 12,778,091 B2
(45) Date of Patent: Nov. 3, 2026

(54) FRESHWATER RECIRCULATING AQUACULTURE INSTALLATION

(71) Applicant: APRIA SYSTEMS, S.L., Guarnizo (ES)

(72) Inventors: Pedro Manuel Gomez Rodriguez, Guarnizo (ES); Raquel Ibañez Mendizabal, Guarnizo (ES); Ana María Urtiaga Mendia, Guarnizo (ES); Inmaculada Ortiz Uribe, Guarnizo (ES)

(73) Assignee: APRIA SYSTEMS, S.L., Guarnizo (ES)

( * ) Notice: Subject to any disclaimer, the term of this patent is extended or adjusted under 35 U.S.C. 154(b) by 276 days.

(21) Appl. No.: 18/567,096

(22) PCT Filed: Jun. 8, 2022

(86) PCT No.: PCT/ES2022/070354
§ 371 (c)(1),
(2) Date: Dec. 5, 2023

(87) PCT Pub. No.: WO2023/281138
PCT Pub. Date: Jan. 12, 2023

(65) Prior Publication Data

US 2024/0260550 A1 Aug. 8, 2024

(30) Foreign Application Priority Data

Jul. 7, 2021 (ES) ............................ ES202131422U

(51) Int. Cl.

| | |
|---|---|
| ***A01K 63/04*** | (2006.01) |
| ***C02F 1/467*** | (2023.01) |
| ***C02F 101/16*** | (2006.01) |

(52) U.S. Cl.
CPC ........... *A01K 63/04* (2013.01); *C02F 1/4674* (2013.01); *C02F 2101/166* (2013.01)

(58) Field of Classification Search
CPC . A01K 63/04; C02F 1/4674; C02F 2101/166; C02F 1/4672; C02F 2101/16; C02F 2101/38; Y02A 40/81
(Continued)

(56) References Cited

U.S. PATENT DOCUMENTS 8,617,403 B1 12/2013 Peters et al.
2015/0090670 A1 4/2015 Eckelberry et al.
(Continued)

FOREIGN PATENT DOCUMENTS

EP 3225597 A1 10/2017
FR 1364912 A 6/1964
(Continued)

OTHER PUBLICATIONS

Apr. 1, 20239—(EP) Search Report of EP22786740.
(Continued)

*Primary Examiner* — Madeline Gonzalez
(74) *Attorney, Agent, or Firm* — Banner & Witcoff, Ltd.

(57) ABSTRACT

Installation for the recirculation of fresh water of the type that includes a pretreatment module for pretreating the water from an aquaculture tank, an oxidation module for the elimination of contaminants and a recirculation of the treated fresh water to the culture tank, after a post-treatment module that also passing through includes an electrochemical module for generating oxidants arranged in an auxiliary line, outside the main line for recirculating the treated fresh water, which is fed by a water recirculation line from the outlet of the post-treatment module, the electrochemical oxidant generation module being decoupled from the oxi-
(Continued)

dation module and in fluid communication with it through an electrogenerated oxidant feed line.

2 Claims, 1 Drawing Sheet

(58) Field of Classification Search
USPC ........ 210/167.01, 620–622, 631, 194, 195.1, 210/196, 198.1, 252, 259
See application file for complete search history.

(56) References Cited

U.S. PATENT DOCUMENTS

| | | | | |
|---|---|---|---|---|
| 2016/0265123 | A1 * | 9/2016 | van Kalken | C25B 1/22 |
| 2018/0050940 | A1 | 2/2018 | Park et al. | |
| 2019/0082661 | A1 * | 3/2019 | Lahav | A01K 63/04 |
| 2019/0380313 | A1 | 12/2019 | Lahav et al. | |

FOREIGN PATENT DOCUMENTS

| | | | |
|---|---|---|---|
| JP | H0823821 | A | 1/1996 |
| JP | 2001-178307 | A | 7/2001 |
| JP | 6251095 | B2 | 12/2017 |

OTHER PUBLICATIONS

Sep. 20, 2022—(ES) International Search Report of PCT/ES/2022/070354.

Romano A. et al., Optimized energy consumption 1, 2 in electro-chemical-based regeneration of RAS water . . . Separation And Purification Technology, Jul. 2, 2020, vol. 240, N° 116638, <DOI: 10.1016/j.seppur.2020.116638> See p. 2, section 2.3; figure 1B.

* cited by examiner

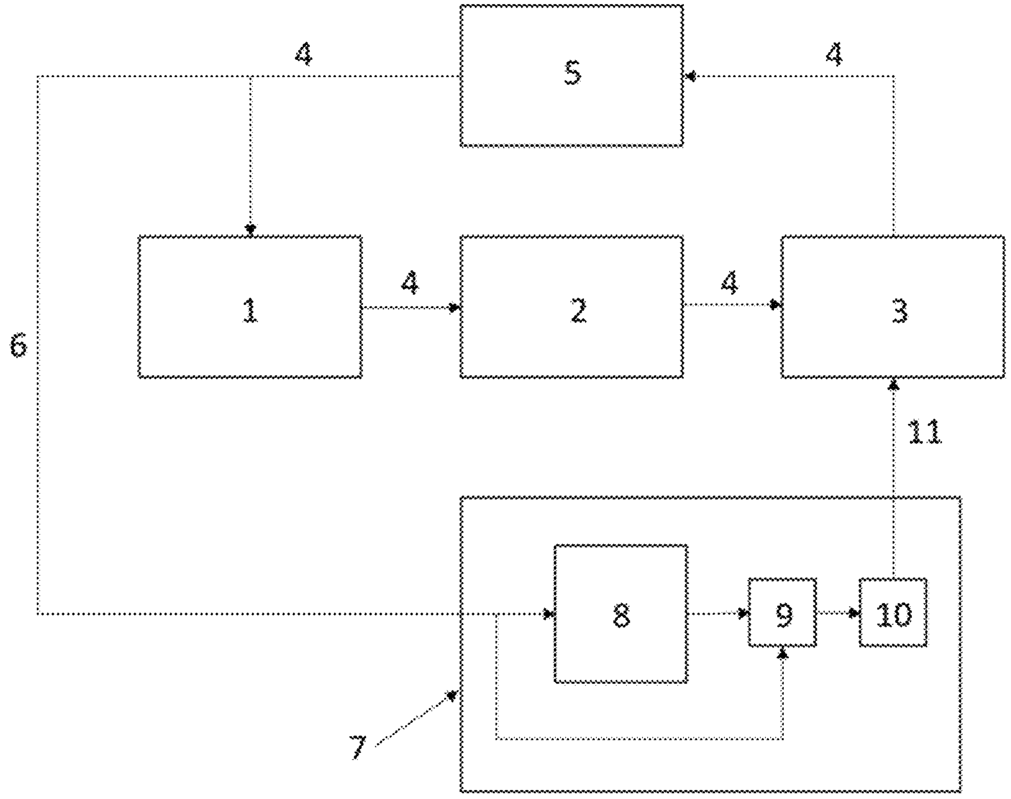
4
5
4
1
4
2
4
3
6
11
8
9
10
7

FRESHWATER RECIRCULATING AQUACULTURE INSTALLATION

The present application is a U.S. National Phase of International Application No. PCT/ES2022/070354 filed Jun. 8, 2022, which claims priority to Spain Application No. U202131422 filed on Jul. 7, 2021. The content of each of the above applications are incorporated herein in their entireties.

TECHNICAL FIELD OF THE INVENTION

The present invention lies within the field of freshwater aquaculture, that is, facilities for rearing fish or other freshwater organisms in which the culture water is reused after treatment.

More specifically, the invention provides an installation for the treatment of fresh water in recirculation, including a module for the pretreatment of water from a culture tank, a module for the electrochemical generation of oxidants to eliminate contaminants, and a recirculation of the treated water back to the culture tank. The electrochemical oxidant generation module is arranged in an auxiliary line, outside the main process water recirculation line, that is, the electrochemical oxidant generation module is decoupled from the main water circuit.

BACKGROUND OF THE INVENTION

Recirculating aquaculture systems (RAS) are well known as systems for the culture of different aquatic organisms where the culture water is reused after it has been treated by physical, chemical and/or biological methods.

Some of these systems are essentially made up of a water pretreatment module for water from an aquaculture tank, an electrochemical oxidation module for the removal of contaminants in which the salinity of the water to be treated is used to generate oxidants and perform electrochemical oxidation and a recirculation of the treated water back to the aquaculture tank.

Although RAS systems represent an advance in the intensification of aquaculture production, they present two main limitations: i) the rapid accumulation of metabolized toxic compounds in the water; and ii) the discharge of significant volumes of wastewater due to the water renewal requirements of conventional treatment systems. To avoid these disadvantages, treatment stations for culture water are implemented in these treatment systems before the culture water is recirculated. An example of these treatment stations is that of stations that include an electrochemical oxidation reactor, in which water treatment is carried out by indirect oxidation through the formation of oxidizing agents. In this regard, see for example EP3225597A1.

This electrochemical oxidation treatment of the culture water enables obtaining a treated water free of contaminants such as total ammonia nitrogen (TAN), nitrites, dissolved organic matter and pathogenic organisms such as bacteria and viruses. Given that this electrochemical oxidation requires the presence of water with a sufficient salt concentration, this treatment is applicable exclusively to aquaculture in salt water, where the salt water can be purified by applying electricity due to the catalytic properties of the materials that make up the electrodes, and this purified salt water is then recirculated back into the system.

To do this, anodic oxidation reactors are used that are formed by packages of flat geometry electrodes whose active anodes are of the DSA (Dimensionally Stable Anodes) type, with the following processes mainly taking place:

- Online or "online" generation of oxidizing agent, oxidation of the chloride ion ($Cl^-$) of the salt in seawater and, therefore, present mainly in seawater—generating chlorine gas ($Cl_2$), which in aqueous solution in turn gives rise to the formation of what is known as active chlorine or free chlorine, which is a mixture of hypochlorous acid (HClO) and hypochlorite ions ($ClO^-$);
- Elimination of NAT: free chlorine reacts with total ammonia nitrogen—nitrogen present in the water from both ammonia ($NH_3$) and ammonium ($NH_4^+$)—forming mainly nitrogen gas ($N_2$), which is totally innocuous, and transforming the free chlorine back into chloride, which enables maintaining the salinity of the water;
- Elimination of nitrites: if they are present, they are also oxidized to nitrate, which is reduced to ammonia nitrogen at the cathode, to later be oxidized again to $N_2$ via chlorine;
- Elimination of organic matter through the oxidants generated: if there is organic matter in the marine culture water, this organic matter experiences a very rapid oxidation reaction, resulting in the improvement of the value of associated specific quality parameters, such as COD and TOC, and even reaching the mineralization of the organic load.

Since the presence of chlorides in the water of the culture tanks is necessary in these known systems, they are only applicable to marine and high salinity aquaculture. For this reason, it would be desirable to achieve an aquaculture installation for the recirculation of fresh water that could use the aforementioned principles.

DESCRIPTION OF THE INVENTION

The present invention is defined and characterized by the independent claims, while the dependent claims describe other characteristics thereof.

The present invention provides a fresh water recirculation installation of the type that includes a module for pretreating the water from an aquaculture tank, an oxidation module for the removal of contaminants and recirculation of the treated water to the aquaculture also includes an tank, wherein the installation autonomous electrochemical oxidant generation module arranged in an auxiliary line, outside the main process fresh water recirculation line, that is, with the electrochemical oxidant generation module decoupled from the oxidation module, but in fluid communication with it.

In this installation, the offline generation of oxidants makes it unnecessary for salt water to circulate through the recirculation line. Thus, the generation of oxidants by electrochemical means is decoupled from the main recirculation line of the already known systems, becoming an auxiliary line. As the generation of oxidants is carried out separately, only this auxiliary line requires salinity. Therefore, fresh water can circulate through the main line and the inherent salinity of the culture medium is preserved.

BRIEF DESCRIPTION OF THE DRAWINGS

This description is complemented with FIG. 1, illustrative of an embodiment of the invention.

FIG. 1 shows a diagram of a fresh water recirculation installation according to an embodiment of the invention.

DETAILED DESCRIPTION OF THE INVENTION

As mentioned, and referring to FIG. 1, the fresh water recirculation installation of the invention is of the type that includes a pretreatment (2) for module pretreating the water from an aquaculture tank (1), an oxidation module (3) for the elimination of contaminants and a recirculation (4) of the treated fresh water to the aquaculture tank (1), after passing through a post-treatment module (5), characterized in that it also includes an oxidant generation module (7) arranged in an auxiliary line, outside the main line for recirculating the treated fresh water (4), which is fed by a water recirculation line (6) from the outlet of the post-treatment module (5), the oxidant generation module (7) being decoupled from the oxidation module (3) and in fluid communication with it through an electrogenerated oxidant feed line (11).

As can be seen, the oxidant generation module (7) includes a brine tank (8), as well as a static mixer (9) associated to the electrochemical reactor (10), which provides the electrogenerated oxidants to the oxidation module (3).

The subsequent stage of treatment or degradation of the polluting load takes place in the recirculation line (4) after dosing the electrogenerated oxidants, the reaction being favored by the intimate contact of the reagents as they pass through the oxidation module (3).

In the installation described here, the dosage of oxidants is adjusted to what is known as breakpoint chlorination, which corresponds to a dose of chlorine such that it allows all the NAT (total ammonia nitrogen) and by-products (chloramines) that may have been formed during the process to be oxidized. In other words, the quantity of oxidants necessary to eliminate the key contaminants is generated by the oxidant generation module (7) described, so as to minimize the amount of residual chlorine in the water and, potentially, reduce the formation of by-products. The increase in salinity of the main line is compensated by introducing a supply and purge current of fresh water intended for cleaning the pre-treatment and post-treatment modules.

On the other hand, the fact of producing oxidants offline allows optimizing the quantity produced, since it takes place in a controlled environment, as well as adjusting the dosage to the contaminant load present in the fresh water of the line to be treated.

The invention claimed is:

1. An installation for the recirculation of fresh water comprising: a pretreatment module (2) for pretreating the water from an aquaculture tank (1), an oxidation module (3) for the elimination of contaminants and a recirculation (4) of the treated fresh water to a culture tank (1), after passing through a post-treatment module (5), an electrochemical oxidant generation module (7) arranged in an auxiliary line, outside a main line for recirculating the treated fresh water (4), which is fed by a water recirculation line (6) from an outlet of the post-treatment module (5), the electrochemical oxidant generation module (7) being decoupled from the oxidation module (3) and in fluid communication with it through an electrogenerated oxidant feed line (11); wherein the electrochemical oxidant generation module (7) is directly connected to the outlet of the post-treatment module (5) and, in use, the water from the recirculating line (4) being the treated fresh water.

2. The fresh water recirculation installation according to claim 1, wherein the electrochemical oxidant generation module (7) includes a brine tank (8), a static mixer (9) associated to an electrochemical reactor (10), which provides electrogenerated oxidants to the oxidation module (3).

* * * * *